(12) United States Patent
Cho

(10) Patent No.: US 10,684,953 B2
(45) Date of Patent: Jun. 16, 2020

(54) DATA STORAGE APPARATUS CAPABLE OF VARYING MAP CACHE BUFFER SIZE

(71) Applicant: SK hynix Inc., Gyeonggi-do (KR)

(72) Inventor: Young Ick Cho, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/214,268

(22) Filed: Dec. 10, 2018

(65) Prior Publication Data

US 2020/0042455 A1 Feb. 6, 2020

(30) Foreign Application Priority Data

Jul. 31, 2018 (KR) ........................ 10-2018-0089226

(51) Int. Cl.
*G06F 12/08* (2016.01)
*G06F 12/0871* (2016.01)
*G06F 3/06* (2006.01)

(52) U.S. Cl.
CPC ........ *G06F 12/0871* (2013.01); *G06F 3/0604* (2013.01); *G06F 3/0631* (2013.01); *G06F 3/0679* (2013.01); *G06F 2212/604* (2013.01)

(58) Field of Classification Search
None
See application file for complete search history.

(56) References Cited

FOREIGN PATENT DOCUMENTS

| KR | 1020160064720 | 6/2016 |
| KR | 1020170102720 | 9/2017 |

*Primary Examiner* — Kevin Verbrugge
(74) *Attorney, Agent, or Firm* — IP & T Group LLP

(57) ABSTRACT

A data storage apparatus includes a nonvolatile memory device, a processor configured to control operation of the nonvolatile memory device, and a memory loaded with a flash translation layer (FTL) including modules, the memory including a map cache buffer configured to cache at least one map segment. The modules include a map module configured to manage a map cache data structure related to the map cache buffer and a map cache allocation module configured to receive, from a module other than the map module, an allocation request for an allocating region having a required size in the map cache buffer; provide the allocation request to the map module; receive allocable size information from the map module; and provide the allocable size information to the module.

14 Claims, 9 Drawing Sheets

MAP SEGMENT-CACHED REGION

DATA STORAGE APPARATUS CAPABLE OF VARYING MAP CACHE BUFFER SIZE

CROSS-REFERENCE TO RELATED APPLICATION

The present application claims priority under 35 U.S.C. § 119(a) to Korean application number 10-2018-0089226, filed on Jul. 31, 2018, which is incorporated herein by reference in its entirety.

BACKGROUND

1. Technical Field

Various embodiments generally relate to a semiconductor apparatus, and more particularly, to a data storage apparatus capable of varying a size of a map cache buffer.

2. Related Art

In recent years, the computer environment paradigm has shifted to ubiquitous computing in which computer systems may be used anytime, anywhere. As a result, use of portable electronic apparatuses such as mobile phones, digital cameras, and laptop computers has been increasing rapidly. Generally, a portable electronic apparatus uses a data storage apparatus that employs memory device(s). Such a storage apparatus may be used to store data used in the associated portable electronic apparatus.

A data storage apparatus using memory device(s) has no mechanical driving units, exhibits good stability and endurance, and has a fast information access rate and low power consumption. Such data storage apparatuses may include a universal serial bus (USB) memory device, a memory card having various interfaces, a universal flash storage (UFS) device, a solid state drive (SSD), and the like.

SUMMARY

Embodiments are provided to a data storage apparatus capable of varying a size of a map cache buffer.

In an embodiment of the present disclosure, a data storage apparatus may include: a nonvolatile memory device; a processor configured to control operation of the nonvolatile memory device, and a memory loaded with a flash translation layer (FTL) including modules, the memory including a map cache buffer configured to cache at least one map segment. The modules include a map module configured to manage a map cache data structure related to the map cache buffer and a map cache allocation module configured to receive, from a module other than the map module, an allocation request for an allocating region having a required size in the map cache buffer; provide the allocation request to the map module; receive allocable size information from the map module; and provide the allocable size information to the module.

In an embodiment of the present disclosure, a data storage apparatus may include: a nonvolatile memory device; a processor configured to control operation of the nonvolatile memory device; and a memory loaded with a flash translation layer (FTL), and including a map cache buffer for caching at least one map segment related to the operation of the nonvolatile memory device. The flash translation layer includes an operation module suitable for controlling the operation of the nonvolatile memory device; a map module suitable for managing a map cache data structure related to the map cache buffer; and a map cache allocation module suitable for receiving, from the operation module, a request on a size to be used in the map cache buffer, providing the request to the map module, receiving allocable size information from the map module; and providing the allocable size information to the operation module. The map module determines allocable size of the map cache buffer in response to the request, and transmits the allocable size information indicating the determined allocable size to the map cache allocation module.

In accordance with embodiments, it is unnecessary for other modules to directly access and correct the map-related data structure managed through the map module and thus the risk in occurrence of operation errors may be reduced by removing dependency between the other modules and the map module.

Further, other modules other than the map module may be implemented with a simple structure which requests allocation of regions within the map cache buffer to the map module and uses allocable regions provided from the map module without access and correction of the map-related data structure and thus maintenance cost may be reduced.

These and other features, aspects, and embodiments are described below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to illustrations of embodiments of the present invention. However, neither the disclosed embodiments of the present invention nor the specifics of the drawings should be construed as limiting the inventive concept. Although a few embodiments of the present invention are shown and described, it will be appreciated by those skilled in the art that changes may be made in these embodiments without departing from the principles and spirit of the present invention. Throughout the specification, reference to "an embodiment" or the like is not necessarily to only one embodiment, and different references to any such phrase are not necessarily to the same embodiment(s).

Figure 1:
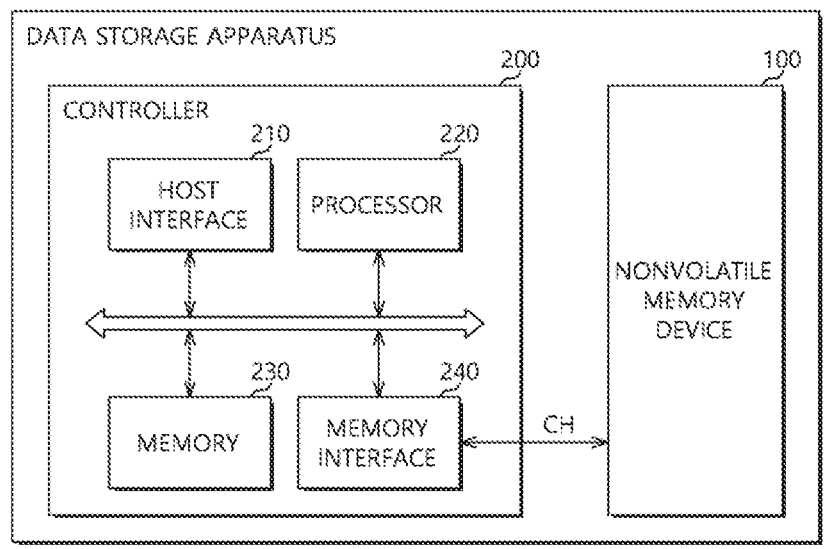
FIG. 1 is a block diagram illustrating a data storage apparatus in accordance with an embodiment of the present disclosure.

FIG. 1 is a block diagram illustrating a data storage apparatus 10 in accordance with an embodiment.

Referring to FIG. 1, the data storage apparatus 10 may store data to be accessed by a host apparatus (not shown) such as a mobile phone, an MP3 player, a laptop computer, a desktop computer, a game player, a television (TV), or an in-vehicle infotainment system, and the like. The data storage apparatus 10 may refer to a memory system.

The data storage apparatus 10 may be configured as any one among various types of storage apparatuses according to an interface protocol coupled to a host apparatus (not shown). For example, the data storage apparatus 10 may be configured as any one of a solid state drive (SSD), a multimedia card (e.g., an MMC, an eMMC, an RS-MMC, and a micro-MMC), a secure digital card (e.g., an SD, a mini-SD, and a micro-SD), a universal serial bus (USB) storage device, a universal flash storage (UFS) device, a personal computer memory card international association (PCMCIA) card type storage device, a peripheral component interconnection (PCI) card type storage device, a PCI-express (PCI-e or PCIe) card type storage device, a compact flash (CF) card, a smart media card, a memory stick, and the like.

The data storage apparatus 10 may be manufactured as any one among various types of packages. For example, the data storage apparatus 10 may be manufactured as any one of a package on package (PoP), a system in package (SEP), a system on chip (SoC), a multi-chip package (MCP), a chip on board (COB), a wafer-level fabricated package (WFP), and a wafer-level stack package (WSP).

The data storage apparatus 10 may include a nonvolatile memory device 100 and a controller 200.

The nonvolatile memory device 100 may be operated as a storage medium of the data storage apparatus 10. The nonvolatile memory device 100 may include any one of various types of nonvolatile memory devices, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (RERAM) using a transition metal compound.

For clarity, although one nonvolatile memory device 100 is illustrated in FIG. 1, the data storage apparatus 10 may include a plurality of nonvolatile memory devices 100, and the present disclosure may be equally applied to the data storage apparatus 10 including the plurality of nonvolatile memory devices 100.

The nonvolatile memory device 100 may include a memory cell array including a plurality of memory cells arranged in regions in which a plurality of word lines and a plurality of bit lines intersect. The memory cell array may include a plurality of memory blocks and each of the plurality of memory blocks may include a plurality of pages.

For example, each of the memory cells in the memory cell array may be a single level cell (SLC) in which a single bit data (for example, 1 bit of data) is to be stored, a multilevel cell (MLC) in which 2 bits of data are to be stored, a triple level cell (TLC) in which 3 bits of data are to be stored, or a quad level cell QLC in which 4 bits of data are to be stored. The memory cell array may include one or more cells among the SLC, the MLC, the TLC, and the QLC. For example, the memory cell array may include memory cells having a two-dimensional (2D) horizontal structure or memory cells having a 3D vertical structure.

The controller 200 may control overall operation of the data storage apparatus 10 through driving of firmware or software loaded into a memory 230. The controller 200 may decode and drive a code-type instruction or algorithm such as firmware or software. The controller 200 may be implemented in hardware or in a combination of hardware and software.

The controller 200 may include a host interface 210, a processor 220, the memory 230, and a memory interface 240. Although not shown in FIG. 1, the controller 200 may further include an error correction code (ECC) engine configured to generate a parity by ECC-encoding write data provided from a host apparatus and ECC-decode read data read out from the nonvolatile memory device 100 using the parity.

The host interface 210 may perform interfacing between a host apparatus and the data storage apparatus 10 in response to a protocol of the host apparatus. For example, the host interface 210 may communicate with the host apparatus through any one among a universal serial bus (USB) protocol, a universal flash storage (UFS) protocol, a multimedia card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, and a PCI express (PCI-e or PCIe) protocol.

The processor 220 may be configured as a micro control unit (MCU) and/or a central processing unit (CPU). The processor 220 may process requests received from a host apparatus. To process such requests, the processor 220 may drive a code-type instruction or algorithm loaded into the memory 230, for example, firmware and control internal function blocks such as the host interface 210, the memory 230, and the memory interface 240 and the nonvolatile memory device 100.

The processor 220 may generate control signals for controlling an operation of the nonvolatile memory device 100 based on the requests received from the host apparatus and provide the generated control signals to the nonvolatile memory device 100 through the memory interface 240.

The memory 230 may be configured as a random access memory such as a dynamic RAM (DRAM) or a static RAM (SRAM). The memory 230 may store firmware driven through the processor 220. The memory 230 may store data (for example, meta data) required for the driving of the firmware. For example, the memory 230 may be operated as a working memory of the processor 220.

The memory 230 may be configured to include a buffer configured to temporarily store write data to be transmitted from a host apparatus to the nonvolatile memory device 100 or read data to be transmitted from the nonvolatile memory device 100 to the host apparatus. For example, the memory 230 may be operated as a buffer memory of the processor 220.

The memory interface 240 may control the nonvolatile memory device 100 according to control of the processor 220. The memory interface 240 may refer to a memory controller. The memory interface 240 may provide the control signals generated through the processor 220 to the nonvolatile memory device 100. The control signals may include a command, an address, an operation control signal, and the like for controlling the nonvolatile memory device 100. The memory interface 240 may provide write data to the nonvolatile memory device 100 or receive read data from the nonvolatile memory device 100.

Figure 2:
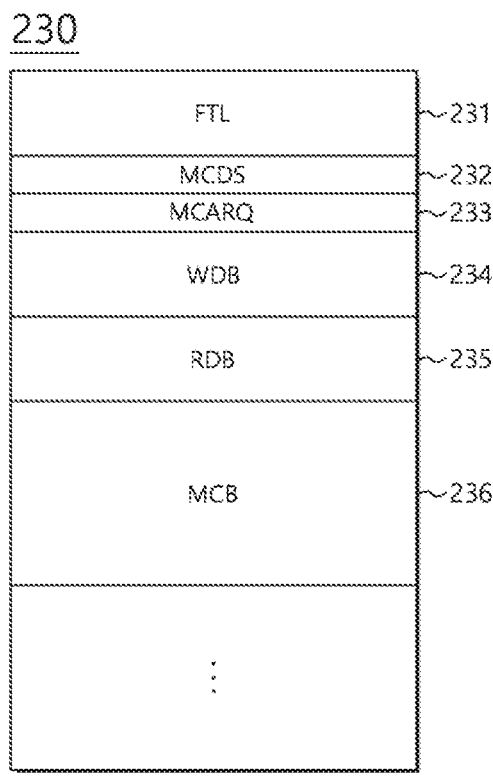
FIG. 2 is a diagram illustrating a memory of a data storage apparatus, such as that of FIG. 1.

FIG. 2 is a diagram illustrating the memory 230 of FIG. 1.

Referring to FIG. 2, the memory 230 may include a first region 231, a second region 232, a third region 233, a fourth region 234, a fifth region 235 and a sixth region 236. In the first region 231, a flash translation layer (FTL) is to be stored. In the second region 232, a map cache data structure (MCDS) is to be stored. In the third region 233, a map cache allocation request queue (MCARQ) is to be stored. In the fourth region 234, which is used as a write data buffer WDB, write data is to be stored temporarily. In the fifth region 235, which is used as a read data buffer RSB, read data is to be stored temporarily. In the sixth region 236, which is used as a map cache buffer MCB, map data is to be cached. The memory 230 may further include other regions used for various purposes in addition to the above-described regions.

The flash translation layer FTL may be software driven through the processor 220. The processor 220 may control an intrinsic operation of the nonvolatile memory device 100 and provide device compatibility to a host apparatus by driving the flash translation layer FTL. Through the driving of the flash translation layer FTL, the host apparatus may use the data storage apparatus 10 by recognizing the data storage apparatus 10 as a general data storage apparatus such as a hard disc. The flash translation layer FTL may include modules configured to perform various functions and meta data required for the driving of the modules. The flash translation layer FTL may be stored in a system region (not shown) of the nonvolatile memory device 100. When the data storage apparatus 10 is powered on, the flash translation layer FTL may be read out from the system region of the nonvolatile memory device 100 and loaded into the first region 231 of the memory 230.

Figure 3:
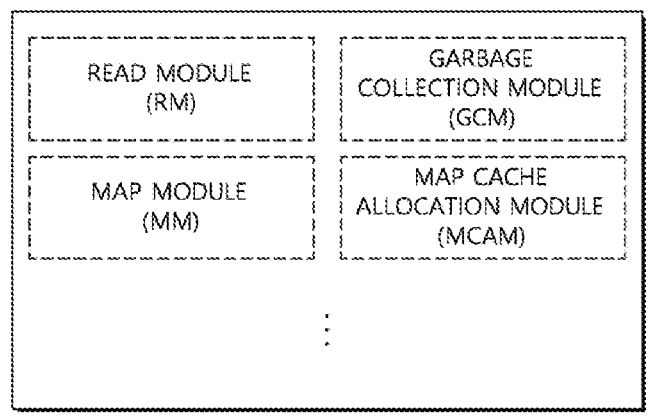
FIG. 3 is a diagram illustrating a flash translation layer (FTL) of a memory, such as that of FIG. 2.

FIG. 3 is a diagram illustrating the flash translation layer FTL of FIG. 2.

Referring to FIG. 3, the flash translation layer FTL may include a read module RM, a garbage collection module GCM, a map module MM, and a map cache allocation module MCAM, but the configuration of the flash translation layer FTL is not limited to this particular arrangement. For example, the flash translation layer FTL may further include a wear-leveling module, a bad block management module, an address map, and the like.

The read module RM may manage the nonvolatile memory device 100 and the memory 230 to process a read request received from a host apparatus. When the read request is received from the host apparatus, the processor 220 may manage the nonvolatile memory device 100 and the memory 230 to perform a series of operations which read data from the nonvolatile memory device 100 by driving the read module RM, temporarily store the read data in the read data buffer RDB shown in FIG. 2, and transmit the temporarily stored read data to the host apparatus.

The garbage collection module GCM may manage the nonvolatile memory device 100 and the memory 230 to perform an operation which collects valid data which are stored in the memory blocks of the nonvolatile memory 100, consolidates the collected valid data into one memory block, and performs an erase operation on invalid data.

The nonvolatile memory device 100 configured of a flash memory device may not support data overwrite due to a structural feature. When data is written in a memory cell in which data has been stored (for example, memory cell in a programmed state) again, the reliability of the data stored in the corresponding memory cell may not be guaranteed. Accordingly, an erase operation on the memory cell in the programmed state may be inevitably preferentially performed to write the data in the memory cell in the programmed state.

Since the erase operation on the nonvolatile memory device 100 is performed in memory block units, a considerably long time for the erase operation may be required. For this reason, when a memory cell corresponding to an address to be written is in a written (or programmed) state, the processor 220 may not perform an operation of erasing the corresponding memory cell and then writing data in the memory cell but may perform an operation of writing data in another memory cell which is already in an erase state. In this case, the data stored in the memory cell to be originally written may be invalid data and the data stored in the other memory cell may be valid data.

Through such an operation of the processor 220, the valid data and invalid data may be mixed in the nonvolatile memory device 100. If necessary, the processor 220 may perform a series of operations which transfer the valid data dispersed in the plurality of memory blocks to one memory block and erase invalid data by driving the garbage collection module GCM. The series of operations may refer to a garbage collection operation.

The map module MM may manage the nonvolatile memory device 100 and the memory 230 to perform operations related to map data. The operations related to the map data may mainly include a map caching operation and a map updating operation, but the operations related to the map data are not limited thereto.

When a write request, a logical block address to be written, and write data are provided from a host apparatus, the processor 220 may perform the map updating operation by driving the map module MM. The map updating operation maps a physical block address in which the write data is stored with the logical block address to be written, stores the mapping information in the memory 230 and updates mapping information of an address mapping table stored in the nonvolatile memory device 100 based on the mapping information stored in the memory 230.

The processor 220 may perform a map caching operation by driving the map module MM. The map caching operation caches a map segment corresponding to the logical block address, which is frequently or recently read-requested from a host apparatus in the map cache buffer MCB of the memory 230.

The map cache allocation module MCAM may receive allocation requests for the map cache buffer MCB from other modules within the flash translation layer FTL and provide the received allocation requests to the map module MM. Further, the map cache allocation module MCAM may receive allocable size information from the map module MM and provide the allocable size information to the other modules.

The regions used as the write data buffer WDB, the read data buffer RDB, and the map cache buffer MCB in the memory 230 may be set sizes. When a sequential read request is received from a host apparatus, a size of read data which is to be read from the nonvolatile memory device 100 and to be stored may be greater than a size of the required map data. In this case, the read module RM may receive allocation of a partial region of the map cache buffer MCB from the map module MM and use the allocated partial region as the read data buffer RDB. When the size of the valid data dispersed in the plurality of memory blocks is large, in performing of the garbage collection operation, the garbage collection module GCM may receive allocation of a partial region of the map cache buffer MCB from the map module MM and use the allocated partial region as a garbage collection buffer.

When the partial region of the map cache buffer MCB is allocated as the read data buffer RDB or the garbage collection buffer, it is necessary to invalidate the map segments cached in the allocated region and correct the data structure MCDS related to the map cache buffer MCB. For example, the data structure MCDS (map cache data structure) related to the map cache buffer MCB may include indexes of the map segments cached in the map cache buffer MCB, the number of map segments, and next position information in which the map segments are to be cached, but this is not limited thereto.

The map cache data structure MCDS may be data managed through the map module MM. Accordingly, when the read module RM or the garbage correction module GCM directly accesses and corrects the map cache data structure MCDS to use the partial region of the map cache buffer MCB, the risk of operation errors occurring due to dependency between the modules may be increased.

For this reason, the flash translation layer FTL in accordance with an embodiment may include the map cache allocation module MCAM serving as an interface between the map module MM and the other modules (for example, read module RM or garbage collection module GCM). Through the map cache allocation module MCAM, these other modules receive the allocation of the partial region of the map cache buffer MCB and use the partial region of the map cache buffer MCB without the direct access of the map cache data structure MCDS of the map module MM.

For example, the read module RM or the garbage collection module GCM may transmit a map cache buffer allocation request (allocation request) including the required size information to the map cache allocation module MCAM. The map cache allocation module MCAM may provide an allocation signal including the allocation-required size information to the map module MM based on the allocation request. The map module MM may determine a currently allocable size with reference to the map cache data structure MCAS based on the received allocation signal and provide the allocable size information to the map cache allocation module MCAM.

The map cache allocation module MCAM may provide the allocable size information provided from the map module MM to the read module RM or the garbage collection module GCM, which may determine whether or not to receive allocation of a region corresponding to the corresponding allocable size and use the allocated region. Then, the read module RM or the garbage collection module GCM may transmit a use permission request to the map cache allocation module MCAM or retransmit the allocation request including desired size information to the map cache allocation module MCAM.

When the use permission request is transmitted from the read module RM or the garbage collection module GCM, the map cache allocation module MCAM may provide a signal (use permission signal) indicating that the use permission request is received to the map module MM. The map module MM may provide the position information (for example, address information) corresponding to the allocated region to the map cache allocation module MCAM. The map cache allocation module MCAM may transmit the position information received from the map module MM to the read module RM or the garbage collection module GCM.

When the allocation request is retransmitted from the read module RM or the garbage collection module GCM, the map cache allocation module MCAM may provide the allocation signal to the map module MM again. Further, the map module MM may determine the allocable size at the corresponding timing with reference to the map cache data structure MCDS. Then, the map module MM may provide the allocable size information to the map cache allocation module MCAM again.

When the use permission signal is provided from the map cache allocation module MCAM, the map module MM may correct the map cache data structure MCDS. Then, the map module MM may provide the position information of a region to be allocated (for example, the address information) to the map cache allocation module MCAM. The operation of correcting the map cache data structure MCDS through the map module MM will be described below.

Figure 4A:
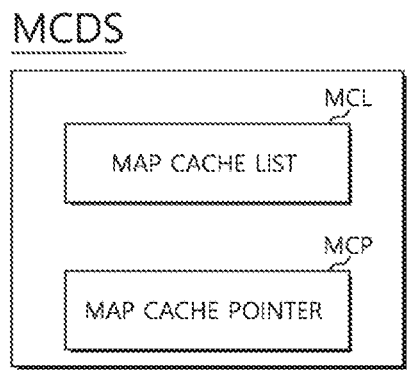
FIG. 4A is a diagram illustrating a data structure related to a map cache buffer, such as that of FIG. 2.
Figure 4B:
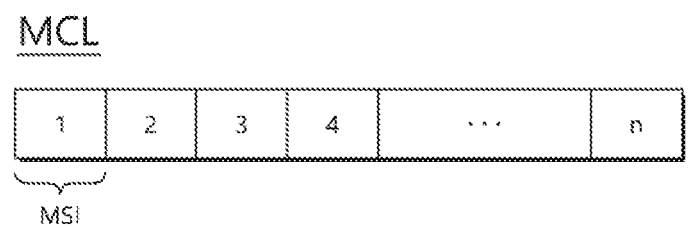
FIG. 4B is a diagram illustrating a map cache list, such as that of FIG. 4A.
Figure 4C:
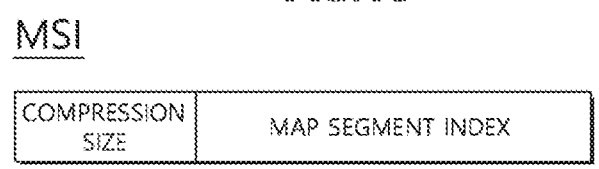
FIG. 4C is a diagram illustrating a map cache index (MSI), such as that of FIG. 4B.
Figure 4D:
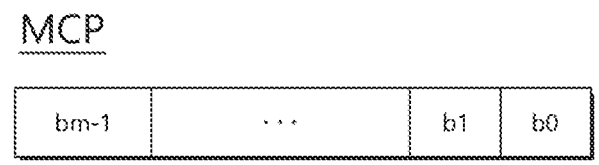
FIG. 4D is a diagram illustrating a map cache pointer, such as that of FIG. 4A.

FIG. 4A is a diagram illustrating a map cache data structure, e.g., the map cache data structure MCDS of FIG. 2, in accordance with an embodiment. FIG. 4B is a diagram illustrating a map cache list, e.g., the map cache list MCL of FIG. 4A, in accordance with an embodiment. FIG. 4C is a diagram illustrating a map cache index, e.g., a map cache index MSI of FIG. 4B, in accordance with an embodiment. FIG. 4D is a diagram illustrating a map cache pointer, e.g., the map cache pointer MCP of FIG. 4A, in accordance with an embodiment.

Referring to FIG. 4A, the map cache data structure MCDS may include the map cache list MCL and the map cache pointer MCP. However, map cache data structure MDCS is not limited to that arrangement; rather, the map cache data structure MCDS may include various meta data related to the map cache buffer MCB.

Referring to FIG. 4B, the map cache list MCL may store the information MSI of the map segments cached in the map cache buffer MCB. For example, the map cache list MCL may store the information MSI of the n cached map segments. Here, n may be an integer of 1 or more. Referring to FIG. 4C, the information MSI of each of the cached map segments may include a compression size of a corresponding map segment and an index of the map segment.

Referring again to FIG. 2, map segments may be cached in the map cache buffer MCB, and each of the map segment may include a plurality of logical address to physical address (L2P) entries. Compressed map segments and non-compressed map segments may be cached in the map cache buffer MCB. The compression sizes of the compressed map segments cached in the map cache buffer MCB may be different from each other.

Referring again to FIG. 3, when the allocation signal is provided from the map cache allocation module MCAM, the map module MM may check the compression sizes of the map segments currently cached in the map cache buffer MCB with reference to the map cache list MCL of the map cache data structure MCDS. The map module MM may determine whether or not to enable allocation of a region having a size corresponding to the allocation-requested size from a start position to an end position of the map cache buffer MCB or from the end position to the start position of the map cache buffer MCB.

When the region having the size corresponding to the allocation-requested size is allocable, the map module MM may provide a signal (for example, allocation enable signal) indicating that the region having the requested size is allocable to the map cache module MCM.

When the region having the size corresponding to the allocation-requested size is not allocable, the map module MM may determine a size of a currently allocable region. Then, the map module MM may provide the size information to the map cache allocation module MCAM.

When the use permission signal is provided from the map cache allocation module MCAM, the map module MM may invalidate the map segments cached in the region to be allocated in the map cache buffer MCB. Also, the map module MM may delete the information MSI of the corresponding map segments from the map cache list MCL. Further, the map module MM may change the value of the map cache pointer MCP illustrated in FIG. 4D to a value indicating next position information in which the map segments are to be cached.

As shown in FIG. 4D, the map cache pointer MCP may be a bit map including m bits b0 to bm−1. Here, m may be 0 (zero) or a natural number of 1 or more. The map cache pointer MCP may be set to a value indicating a next position in which the map segments are to be cached in the map cache buffer MCB.

Figure 5A:
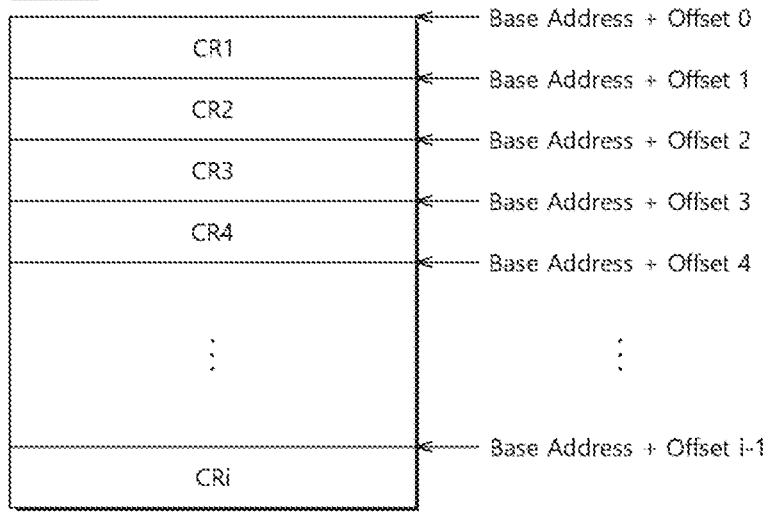
FIG. 5A is a diagram illustrating a map cache buffer, such as that of FIG. 2.
Figure 5B:
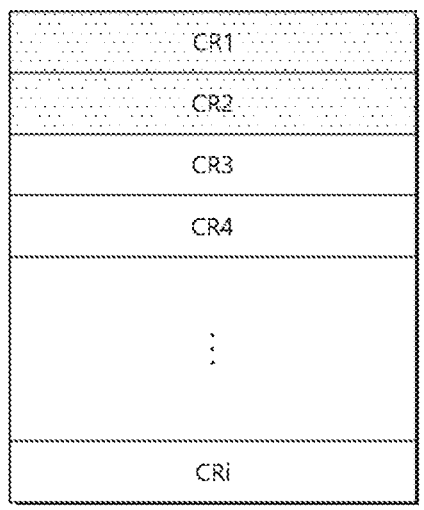
FIG. 5B is a diagram illustrating an example that a map cache pointer is set to a value indicating position information of a map cache buffer in which map segments are to be cached in accordance with an embodiment of the present disclosure.
Figure 5B:
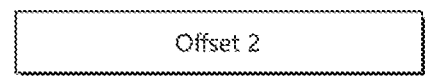
Figure 5B:
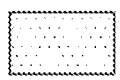

FIG. 5A is a diagram illustrating the map cache buffer MCB in accordance with an embodiment. FIG. 5B is a diagram illustrating an example that the map cache pointer MCP is set to a value indicating position information of the map cache buffer MCB in which the map segments are to be cached in accordance with an embodiment.

Referring to FIG. 5A, the map cache buffer MCB may include i caching regions, for example, first to i-th caching regions CR1 to CRi. Here, i may be a natural number of 1 or more. When the start address of the first caching region CR1 is a base address, start addresses of the second to i-th caching regions CR2 to CRi may be values given as first to (i−1)-th offsets, i.e., Offset 1 to Offset (i−1) respectively, to the base address.

Referring to FIG. 5B, the map cache pointer MCP may be set to the offsets corresponding to the start addresses of the first to i-th caching regions CR1 to CRi, but the present invention is not limited thereto. For example, when the map segments are cached in the first and second caching regions CR1 to CR2 of the map cache region MCB, the map cache pointer MCP may be set to a value indicating second offset Offset 2, which represents information on the next position of the map cache buffer MCB in which the map segments are to be cached. The map module MM may check the map cache pointer MCP and cache the map segments in the third caching region CR3 in the map cache operation.

Since the map segments cannot be cached in caching regions allocated to other modules among the caching regions of the map cache buffer MCB, the map module MM may set the offset so that the map cache pointer MCP indicates one of the non-allocated caching regions.

Figure 6:
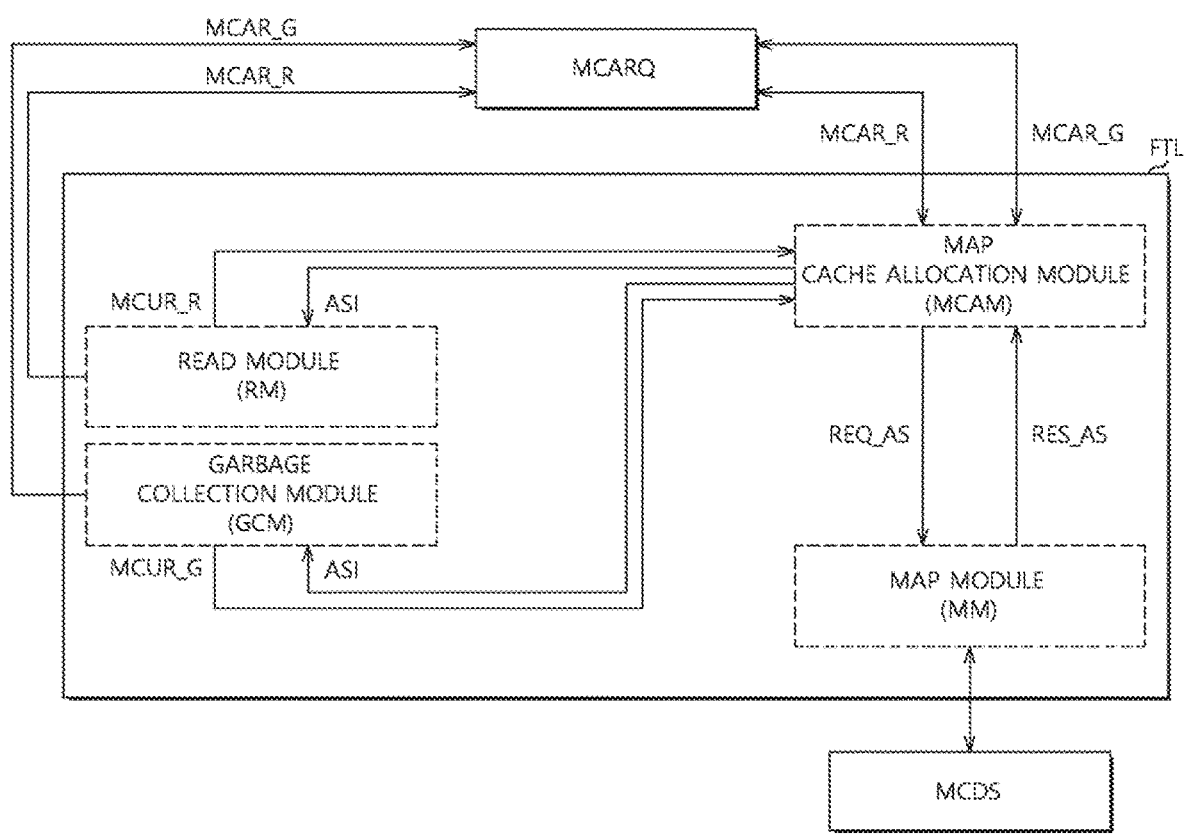
FIG. 6 is a diagram illustrating a map cache buffer allocation process in accordance with an embodiment of the present disclosure.

FIG. 6 is a diagram illustrating a map cache buffer allocation process in accordance with an embodiment of the present disclosure.

Referring to FIG. 6, map cache allocation requests MCAR_R and MCAR_G may be queued in the map cache allocation request queue MCARQ in transmitted order. The map cache allocation requests MCAR_R and MCAR_G may be received from the read module RM and the garbage collection module GCM, respectively. The map cache allocation module MCAM may determine whether or not the queued map cache allocation requests are present by periodically scanning the map cache allocation request queue MCARQ. The map cache allocation module MCAM may dequeue the map cache allocation requests in queued order when the map cache allocation requests queued in the map cache allocation request queue MCARQ are present.

The map cache allocation module MCAM may provide an allocation signal REQ_AS based on the map cache allocation requests MCAR_R and MCAR_G dequeued from the map cache allocation request queue MCARQ. The allocation signal REQ_AS may include the size information to be allocated to the map module MM.

The map module MM may determine the size of the allocable region with reference to the map cache data structure MCDS. Further, the map module MM may provide a response signal RES_AS including the allocable size information to the map cache allocation module MCAM. The map cache allocation module MCAM may transmit allocable size information ASI to the read module RM and the garbage collection module GCM based on the response signal RES_AS provided from the map module MM.

The read module RM and the garbage collection module GCM may check the allocable size information ASI received from the map cache allocation module MCAM, and determine whether or not to use the corresponding region. Further, the read module RM and the garbage collection module GCM may transmit use permission requests MCUR_R and MCUR_G, respectively to the map cache allocation module MCAM based on the determination result. Alternatively, the read module RM and the garbage collection module GCM may retransmit the map cache allocation requests MCAR_R and MCAR_G including desired allocation size information to the map cache allocation module MCAM based on the determination result. The retransmitted map cache allocation requests MCAR_R and MCAR_G may be queued in the map cache allocation request queue MCARQ in transmitted order.

In the above-described embodiments, the modules such as the read module RM and the garbage collection module GCM may not directly access and correct the data structure inside the map module MM (for example, map cache data structure MCDS) but may transmit allocation requests including desired size information to the map module MM through the map cache allocation module MCAM. Further, the read module RM and the garbage collection module GCM may determine whether or not to use an allocated region by receiving the allocable size information through the map cache allocation module MCAM, and use the allocated region. Accordingly, the access and management for the map cache data structure MCDS may be performed only through the map module MM and thus the risk of operation errors occurring may be reduced by removing the dependency between the modules.

The read module RM and the garbage collection module GCM may be implemented in a simple structure which transmits the allocation requests to the map module MM through the map cache allocation module MCAM and uses the provided allocation region. As a result, maintenance cost may be saved.

Figure 7:
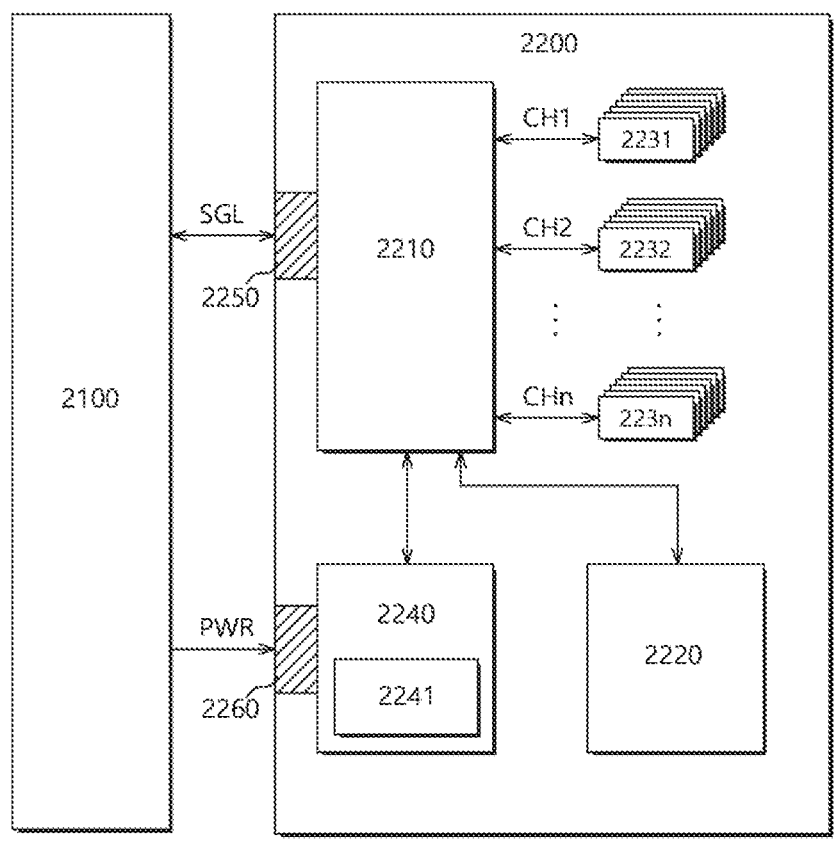
FIG. 7 is a diagram illustrating a data processing system including a solid state drive (SSD) in accordance with an embodiment of the present disclosure.

FIG. 7 is a diagram illustrating a data processing system 2000 including a solid state drive (SSD) 2200 in accordance with an embodiment. Referring to FIG. 7, the data processing system 2000 may include a host apparatus 2100 and the SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the same channel may be coupled to the same signal bus and the same data bus.

The power supply 2240 may provide power PWR input through the power connector 2260 to components within the SSD 2200. The power supply 2240 may include an auxiliary power supply 2241. The auxiliary power supply 2241 may supply the power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 8:
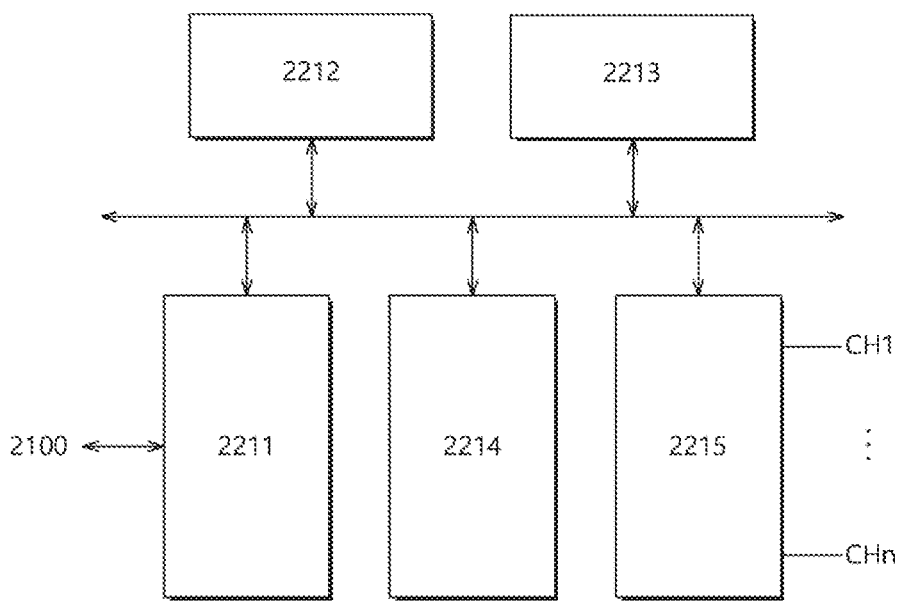
FIG. 8 is a diagram illustrating a controller, such as that illustrated in FIG. 7.

FIG. 8 is a diagram illustrating a controller, e.g., the controller 2210 of FIG. 7, in accordance with an embodiment of the present disclosure. Referring to FIG. 8, the controller 2210 may include a host interface 2211, a control component 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (DATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface 2211 may perform a disc emulation function such that the host apparatus 2100 recognizes the SSD 2200 as a general-purpose data storage apparatus, for example, a hard disc drive HDD.

The control component 2212 may analyze and process the signal SGL input from the host apparatus 2100. The control component 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 9:
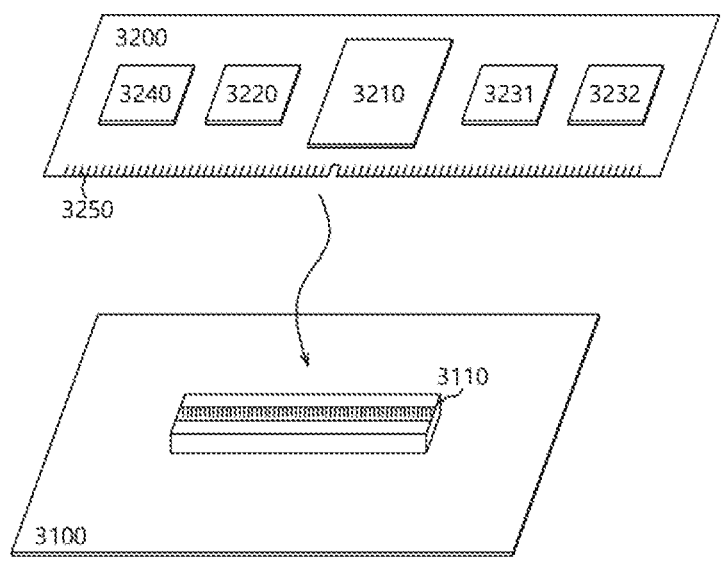
FIG. 9 is a diagram illustrating a data processing system including a data storage apparatus in accordance with an embodiment of the present disclosure.

FIG. 9 is a diagram illustrating a data processing system 3000 including a data storage apparatus 3200 in accordance with an embodiment. Referring to FIG. 9, the data processing system 3000 may include a host apparatus 3100 and the data storage apparatus 3200.

The host apparatus 3100 may be configured in a board form such as a printed circuit board (PCB). Although not shown in FIG. 9, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured the same or substantially the same as the controller 2210 illustrated in FIG. 8.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to components within the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in any of various forms according to an interfacing method between the host apparatus 3100 and the data storage apparatus 3200. The connection terminal 3250 may be arranged in or on any side of the data storage apparatus 3200.

Figure 10:
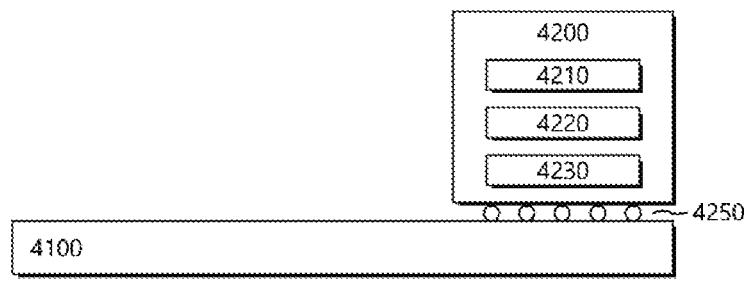
FIG. 10 is a diagram illustrating a data processing system including a data storage apparatus in accordance with an embodiment of the present disclosure.

FIG. 10 is a diagram illustrating a data processing system 4000 including a data storage apparatus 4200 in accordance with an embodiment. Referring to FIG. 10, the data processing system 4000 may include a host apparatus 4100 and the data storage apparatus 4200.

The host apparatus 4100 may be configured in a board form such as a printed circuit board (PCB). Although not shown in FIG. 10, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same or substantially the same as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 11:
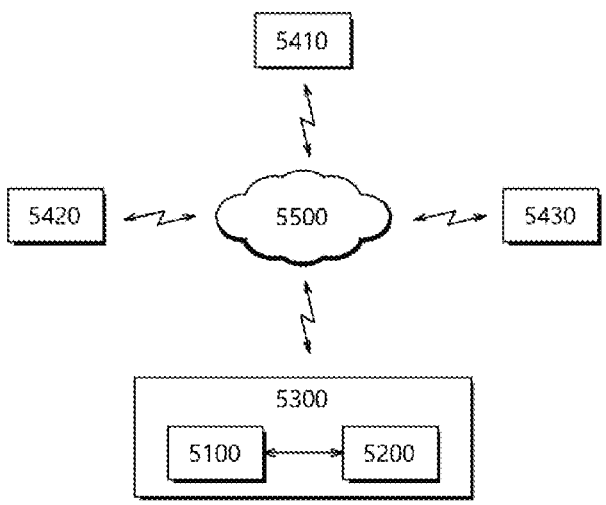
FIG. 11 is a diagram illustrating a network system including a data storage apparatus in accordance with an embodiment of the present disclosure.

FIG. 11 is a diagram illustrating a network system 5000 including a data storage apparatus in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may include the electronic apparatus 10 of FIG. 1, the data storage apparatus 2200 of FIG. 7, the data storage apparatus 3200 of FIG. 9, or the data storage apparatus 4200 of FIG. 10.

Figure 12:
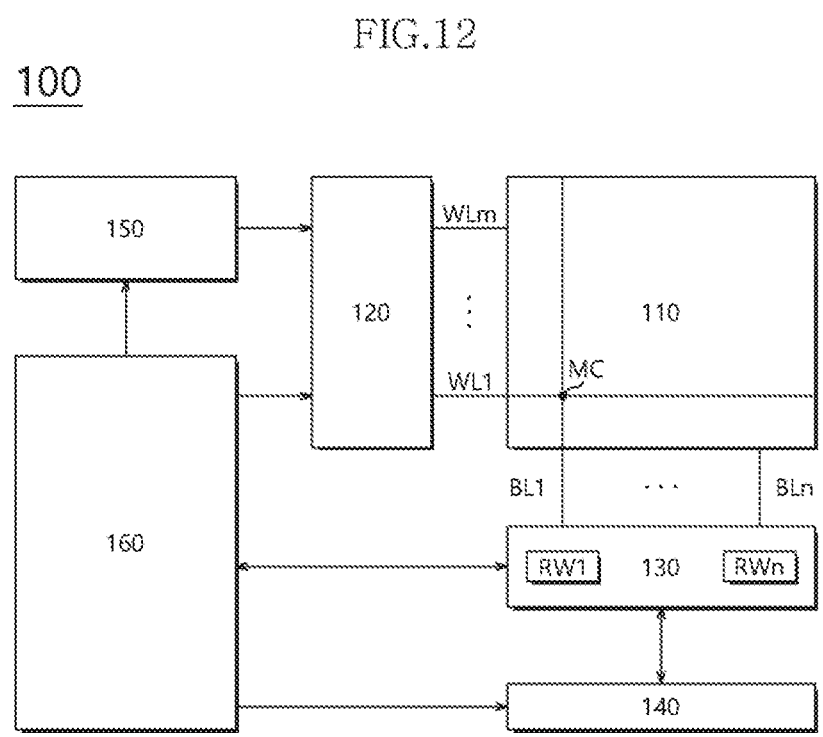
FIG. 12 is a block diagram illustrating a nonvolatile memory device included in a data storage apparatus in accordance with an embodiment of the present disclosure.

FIG. 12 is a block diagram illustrating a nonvolatile memory device 100 included in a data storage apparatus in accordance with an embodiment. Referring to FIG. 12, the nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate, not to limit the present invention. Various alternatives and equivalents are possible, as those skilled in the art will recognize in light of the present disclosure. The invention is not limited by the embodiments described herein. Nor is the invention limited to any specific type of semiconductor device. The present invention includes any and all additions, subtractions, or modifications that fall within the scope of the appended claims.

What is claimed is:

1. A data storage apparatus comprising:
a nonvolatile memory device;
a processor configured to control operation of the nonvolatile memory device; and
a memory loaded with a flash translation layer (FTL) including modules, the memory including a map cache buffer configured to cache at least one map segment,
wherein the modules include:
a map module configured to manage a map cache data structure related to the map cache buffer; and
a map cache allocation module configured to:
receive, from a module other than the map module, an allocation request for allocating a region having a required size in the map cache buffer;
provide the allocation request to the map module;
receive allocable size information from the map module; and
provide the allocable size information to the module.

2. The data storage apparatus of claim 1, wherein the map cache data structure includes:
a map cache list configured to store compression sizes and indexes of the cached map segments; and
a map cache pointer configured to set a value indicating position information of the map cache buffer in which the map segments are to be cached.

3. The data storage apparatus of claim 2, wherein the map module determines the allocable size information with reference to the compression sizes of the map cache list when the allocation request is received from the map cache allocation module.

4. The data storage apparatus of claim 2, wherein the module determines whether or not to use corresponding region by checking the allocable size information provided from the map cache allocation module, and transmits a use permission request to the map cache allocation module or retransmits the allocation request including desired size information, based on the determination.

5. The data storage apparatus of claim 4, wherein the map cache allocation module provides the use permission request received from the module to the map module, and the map module provides position information for a region to be allocated in the map cache buffer to the map cache allocation module.

6. The data storage apparatus of claim 5, wherein the map module deletes information corresponding to map segments cached in the region to be allocated from the map cache list and changes the map cache pointer to a value indicating position information of at least one among non-allocated regions of the map cache buffer.

7. The data storage apparatus of claim 1, wherein the module includes at least one of a read module and a garbage collection module.

8. The data storage apparatus of claim 7, wherein the module transmits the allocation request including required size information to the map cache allocation module.

9. The data storage apparatus of claim 8, wherein the map module determines whether or not an allocable region having a size corresponding to the required size is present in the map cache buffer with reference to the map cache data structure, and provides an allocation enable signal to the map cache allocation module when the allocable region having the size corresponding to the required size is present.

10. The data storage apparatus of claim 9, wherein the map module checks a size of a currently allocable region and then provides the allocable size information to the map cache allocation module when the allocable region having the size corresponding to the required size is not present.

11. The data storage apparatus of claim 1, wherein the modules in the flash translation layer are driven through the processor.

12. The data storage apparatus of claim 1, wherein the memory further includes a map cache allocation request queue configured to queue the allocation requests received from the module in transmitted order.

13. The data storage apparatus of claim 12, wherein the map cache allocation module determines whether or not queued allocation requests are present by periodically scanning the map cache allocation request queue, and dequeues the queued allocation requests in queued order when the queued allocation requests are present.

14. A data storage device comprising:
a nonvolatile memory device;
a processor configured to control operation of the nonvolatile memory device; and
a memory loaded with a flash translation layer (FTL), and including a map cache buffer for caching at least one map segment related to the operation of the nonvolatile memory device,
wherein the flash translation layer includes:
an operation module suitable for controlling the operation of the nonvolatile memory device;
a map module suitable for managing a map cache data structure related to the map cache buffer; and
a map cache allocation module suitable for receiving, from the operation module, a request on a size to be used in the map cache buffer, providing the request to the map module, receiving allocable size information from the map module; and providing the allocable size information to the operation module,
wherein the map module determines allocable size of the map cache buffer in response to the request, and transmits the allocable size information indicating the determined allocable size to the map cache allocation module.

* * * * *